United States Patent
Horiuchi et al.

(10) Patent No.: US 6,189,385 B1
(45) Date of Patent: *Feb. 20, 2001

(54) SHAKING TABLE AND METHOD OF CONTROLLING THE SAME

(75) Inventors: Toshihiko Horiuchi, Ushiku; Takao Konno, Minori-machi, both of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/043,348
(22) PCT Filed: Sep. 18, 1995
(86) PCT No.: PCT/JP95/01850
§ 371 Date: Mar. 18, 1998
§ 102(e) Date: Mar. 18, 1998
(87) PCT Pub. No.: WO97/11344
PCT Pub. Date: Mar. 27, 1997

(51) Int. Cl.$^7$ .................................................. G01M 7/00
(52) U.S. Cl. ........................................ 73/664; 73/663
(58) Field of Search ........................ 73/662, 663, 665, 73/666, 667, 668, 664; 364/578, 512, 150

(56) References Cited

U.S. PATENT DOCUMENTS

| | | | |
|---|---|---|---|
| 3,803,906 | * 4/1974 | Ross | 73/664 |
| 4,061,017 | * 12/1977 | Sloane et al. | 73/579 |
| 4,297,888 | * 11/1981 | Hirai et al. | 73/664 |
| 4,537,077 | * 8/1985 | Clark et al. | 73/665 |
| 4,991,107 | * 2/1991 | Sloane | 364/508 |
| 5,060,519 | * 10/1991 | Chojitani et al. | 73/662 |
| 5,144,176 | * 9/1992 | Popper | 310/81 |
| 5,179,516 | * 1/1993 | Choshitani et al. | 364/167.01 |
| 5,299,459 | * 4/1994 | Underwood | 73/664 |
| 5,388,056 | 2/1995 | Horiuchi et al. | 364/508 |
| 5,422,834 | 6/1995 | Horiuchi et al. | 364/578 |
| 5,737,239 | 4/1998 | Horiuchi et al. | 364/508 |

FOREIGN PATENT DOCUMENTS

| | | |
|---|---|---|
| 55-12975 | 3/1973 | (JP) . |
| 53-116859 | 3/1977 | (JP) . |
| 5-10158 | 9/1984 | (JP) . |
| 59-197902 | 11/1984 | (JP) . |
| WO91/18271 | * 11/1991 | (WO) . |

* cited by examiner

Primary Examiner—Richard A. Moller
(74) Attorney, Agent, or Firm—Evenson, McKeown, Edwards & Lenahan, P.L.L.C.

(57) ABSTRACT

A shaking table has a control unit for controlling the shaking table so that a target waveform signal is reproduced with at least an acceleration measuring signal as a feedback signal. The control unit is adapted for effecting control by employing the force applied to the shaking table from a specimen under test loaded on the shaking table as the feedback signal. As a control error deriving from the force is canceled, highly accurate acceleration reproducibility is attainable even in the case of a non-linear specimen under test whose dynamic characteristics fluctuate with time.

10 Claims, 8 Drawing Sheets

SHAKING TABLE AND METHOD OF CONTROLLING THE SAME

BACKGROUND AND SUMMARY OF THE INVENTION

The present invention relates to a shaking table for use as a shaking test apparatus and a method of controlling the same, and more particularly to a shaking table having improved shaking acceleration reproducibility and an improved control method.

A shaking table is an apparatus used for the shaking test of a structure or an apparatus for shaking a structure by driving a table on which the structure as a specimen under test is placed by an actuator. The table may be held by proper bearings.

One of the application fields of the shaking table is the seismic test, in which the earthquake resistance of a structure is tested. Because the purpose of the seismic test is to evaluate the response of a structure to predetermined acceleration waveforms, it is required to reproduce with accuracy the predetermined acceleration waveforms using the table. Therefore, increasing the accuracy of such an acceleration waveform resulting from shaking is obtainable by installing displacement and/or acceleration sensors on the shaking table in order to measure the motion of the table and feed back the measured results to a shaker control unit with predetermined acceleration waveforms as target values (e.g., "Servo Mechanism of Three Dimensional Six Freedom Shaking Table" by Sugano, Machine Design (Japanese), Vol. 35, No. 4, April, 1991, pp 25–28).

In a case where a specimen under test put on the table is relatively light, those methods mentioned above may be used to obtain highly accurate waveforms resulting from shaking, but when the weight of a specimen under test is heavy, desired acceleration waveforms cannot be obtained because the force from the specimen under test generated by shaking and applied to the table is also large. Because the counter-reaction force from the specimen under test acts to restrict the motion of the table particularly when the specimen under test is shaken at a frequency close to the natural frequency of the specimen under test, the acceleration waveform resulting from shaking tends to become small.

As disclosed in "Electro-Hydraulic Shaking Machine (3rd Report)" by Hirai and Matsuzaki in Bulletin of Japanese Society of Mechanical Engineers (Japanese)., Vol. 42, No. 361, pp 2,744–2,751, techniques for improving acceleration waveforms resulting from shaking have been proposed by installing models of specimens under test in the control circuits of shakers as compensators. As also disclosed in Japanese Patent Laid-Open No. 197902/1984, a random wave having a relatively small amplitude is input as a target acceleration waveform in such a state that a specimen under test has been loaded, an actually obtained accelerator waveform resulting from shaking a transfer function from the target to the actually obtained acceleration waveform resulting from shaking is calculated, and at the time of actual shaking the target waveform via the inverse transfer function is used as the input.

This known technique is effective when the natural frequency and/or damping is constant and the dynamic characteristics of the specimen under test remain unchanging during the shaking and the reproducibility of acceleration becomes good. When the specimen under test has non-linearity, however, the characteristics may vary during the shaking because of the dependence on the response amplitude. In a case where the specimen under test is shaken until it is damaged, the stiffness of the specimen under test rapidly changes, thus causing the dynamic characteristics to vary. In the case of a shaking test on the ground liquefaction, the occurrence of liquefaction makes the dynamic characteristics change greatly. In this case, the acceleration waveforms obtained through the aforementioned methods may become different from those desired.

Even in fields other than seismic testing, it may become necessary to evaluate strength by shaking a structure with acceleration of the random waveform having a predetermined spectrum density. In this case, such a predetermined spectrum density may not be obtained due to a phenomenon similar to the case of the earthquake test. In order to solve this problem, various methods including the aforementioned ones have been employed; nevertheless, shaking accuracy may be lowered due to the non-linearity of the specimen under test.

An object of the present invention for solving the foregoing problems is to provide a shaking table making available highly accurate acceleration waveforms resulting from shaking without being influenced by a specimen under test on a table and by changes of the dynamic characteristics of the specimen, and a method of controlling the shaking table.

A shaking table according to the present invention comprises a table for loading a specimen under test, driving means for driving the table, (first measuring means for measuring the acceleration of the table, and a control unit for for receiving a target signal and comparing the target signal with an output from the first measuring means in order to effect the feedback control of the driving means on the basis of a deviation from the target signal wherein the table may be provided with second measuring means for detecting the force applied from the specimen under test and wherein the output from the second measuring means may be fed back to the control unit.

At this time, the control unit may be provided with a filter having for its transfer function the inverse transfer function of a transfer function from a position where the force detected by the force measuring means is fed back up a position where the driving force of the table is generated. In one preferred mode, a transfer function up to the driving means for driving the table may be taken into consideration.

Such a filter may be provided as hardware means such as an electric circuit or implemented by calculating means such as a DSP (Digital Signal Processor) When this filter is implemented by the provision of the calculating means, it may be provided for the control unit.

For the shaking table according to the present invention, the force measuring means may be provided between the table and the specimen under test.

For the shaking table according to the present invention, the force measuring means may be provided between the driving means and the table.

For the shaking table according to the present invention, an acceleration detector as the first measuring means, and processing means for subtracting a value resulting from multiplying the acceleration detected by the acceleration detector by the mass of the table from the force detected by the force measuring means may be provided.

A shaking table according to the present invention comprises a table for loading a specimen under test, driving means for driving the table, first measuring means for measuring the motion of the table, and a control unit for feeding back the value detected by the first measuring means and comparing the feedback value with a target value in order to control the driving means on the basis of a deviation from the target value. An oil-hydraulic actuator as the driving means, means for detecting the differential pressure in the piston portion of the oil-hydraulic actuator, processing means for multiplying the differential pressure by the area presented to the piston portion, and means for correcting the deviation on the basis of the result processed by the processing means may be added to the construction of the shaking table.

A method of controlling a shaking table according to the present invention comprising a table for loading a specimen under test, driving means for driving the table, first measuring means for measuring the motion of the table, and a control unit for feeding back the value detected by the first measuring means and comparing the feedback value with a target value in order to control the driving means on the basis of a deviation from the target value includes the steps of measuring the force applied to the table from the specimen under test, subjecting the force to filter processing, and processing the subtraction of the processed result from a target acceleration waveform in order to control the driving means on the basis of this processed result.

At this time, the filter processing may be performed with the inverse transfer function of the transfer function from a subtraction processing unit for subtracting the result of the filter processing from the target acceleration waveform up to the driving means.

A shaking table according to the present invention comprises a table for loading a specimen under test placed on a base via bearings, an actuator for shaking the table fixed onto the base, an acceleration detector for detecting the acceleration of the table, a load cell placed on the table, for detecting the force applied to the table from the specimen under test while carrying the specimen under test and a control unit for controlling the actuator on the basis of the force detected by the load cell and the acceleration. The control unit may include means for correcting the force, comparison means for obtaining the deviation of the corrected force from a target value, means for amplifying the deviation, and means for inputting the amplified deviation to the actuator, wherein the means for correcting the load may be adapted for correcting the force by using the inverse transfer function of a transfer function from the comparison means up to the shaker.

A shaking table according to the present invention comprises a table for loading a specimen under test placed on a base via bearings, an oil-hydraulic actuator for shaking the table fixed onto the base, an acceleration detector for detecting the acceleration of the table, means for detecting the differential pressure in the piston portion of the oil-hydraulic actuator, and a control unit for controlling the oil-hydraulic actuator. The control unit may be provided with means for obtaining a force by multiplying the differential pressure by the area presented to the piston portion of the oil-hydraulic actuator, means for correcting the force, comparison means for obtaining the deviation of the corrected force from a target value, means for amplifying the deviation, and means for inputting the amplified deviation to the actuator, wherein means for correcting the force may be adapted for correcting the force by using the inverse transfer function of a transfer function from the comparison means up to the actuator and wherein the control unit may control the oil-hydraulic actuator on the basis of the differential pressure and the acceleration.

According to the present invention, because the force applied to the table from the specimen under test can be canceled by the driving force applied to the table from the driving means, acceleration or an acceleration waveform is highly accurately reproducible without being affected by the fluctuation of the dynamic characteristics of the specimen under test.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 2:
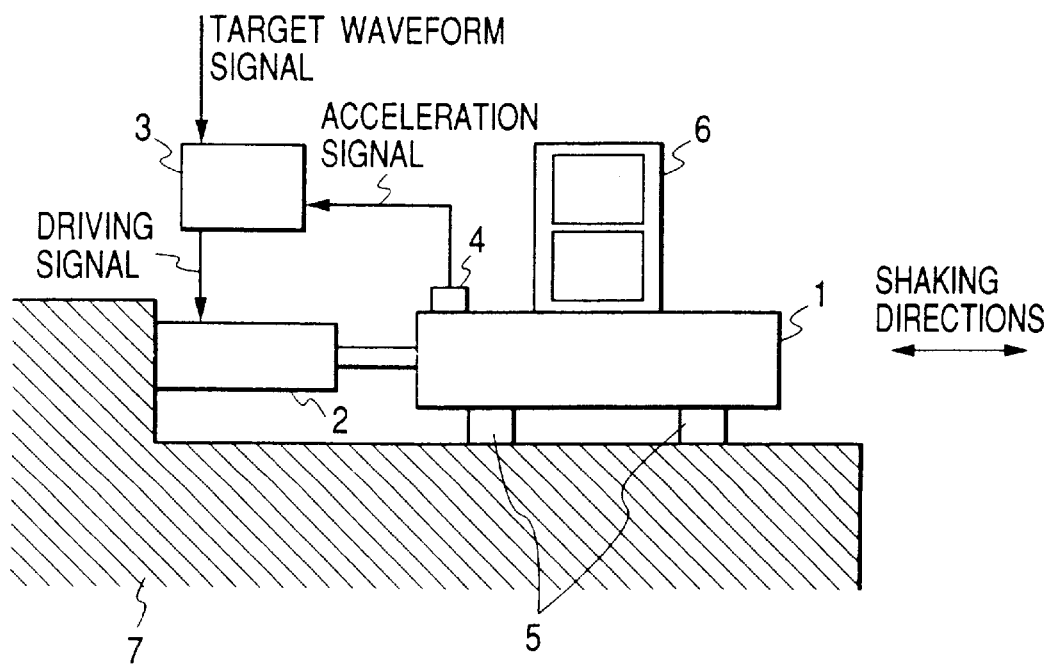
FIG. 2 is a schematic diagram illustrating an exemplary conventional shaking table.

First, a description will be given of a conventional shaking table as shown in FIG. 2. A table 1 is supported on a base 7 via bearings 5. However, the bearings 5 are not necessarily required, depending on the construction of the shaking table. The table 1 is also coupled to an actuator 2 installed on the base 7. An acceleration measuring means 4 is installed on the table 1. With at least the value measured by the acceleration measuring means 4 as a feedback signal, the actuator is controlled by a control unit 3 so that a target waveform is attained. A specimen under test 6 is placed on the table 1 and a response to the shaking acceleration attained by the table is measured by various conventional sensors (not shown) installed on the specimen under test.

Figure 3:
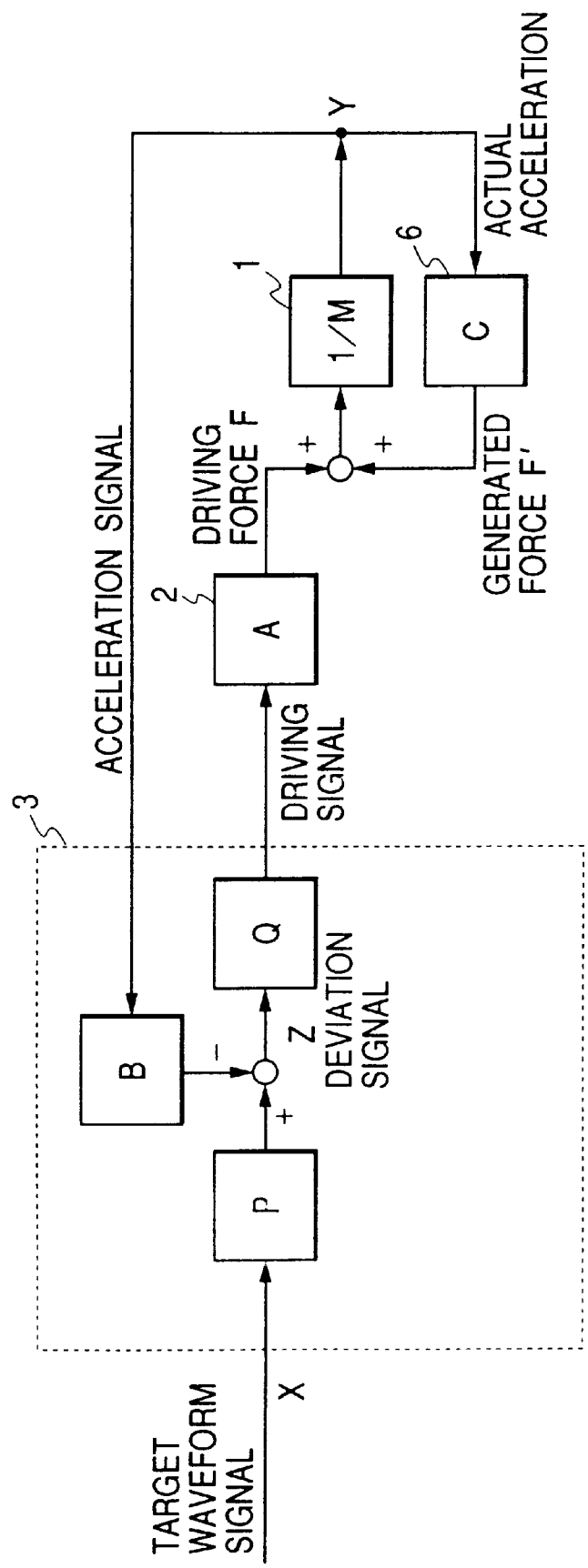
FIG. 3 is a block diagram illustrating a mode for controlling the conventional shaking table.

FIG. 3 shows a block diagram in which the shaking table is kept under control. A target waveform X such as an earthquake acceleration waveform is inputted to the control unit 3 of the actuator in the form of a voltage signal proportional to the acceleration to be attained. The acceleration (to be exact, the value measured by the acceleration measuring means 4 installed on the table 1) attained by the table 1 is fed back before being subjected to the processing shown by a block B, and the processed acceleration is compared with a signal resulting from X that has been subjected to a proper processing P in order to calculate a deviation signal Z. A signal for driving the actuator 2 is outputted by subjecting the deviation signal Z to a proper processing Q. The shaker is then caused to generate table driving force F on the basis of this signal. Consequently the acceleration Y is attained. Given that effective mass is M, a transfer function from F to Y becomes (1/M). When the specimen under test 6 is loaded on the table 1 at this time, the specimen under test is shaken because of the acceleration Y and a force F' is applied to the table from the specimen under test. The transfer function of the acceleration Y and the force F' are represented by C. Although at least an acceleration signal is fed back in the case of the shaking table, velocity displacement and so on may be fed back according to circumstances. In such a case, not only the acceleration but also the target signal of displacement velocity is outputted by the processing P and the calculation of the deviation signal is carried out as a vector. Therefore, P, B are one-input/multi-output processing, whereas Q is a multi-input/one-output processing.

An X-to-Y transfer function in the state of a no-load (in a case where no specimen under test is loaded) is expressed by the following equation:

$$Y=\{(1+AQB/M)^{-1}AQP/M\}X \quad (1)$$

The control unit and the shaker are used by adjusting the inside { } from the above Equation (1) to substantially 1 within the frequency range of use. In the case where the specimen under test is loaded, however, the transfer function is changed to the following equation:

$$Y=\{(1+AQB/M-C)^{-1}AQP/M\}X \quad (2)$$

Consequently, the control unit adjusted under the condition of Equation (1) demonstrates that the accuracy of attainable acceleration is worsened as the dynamic characteristics of the shaking table. When C is known beforehand, the accuracy is maintainable by adjusting the inside of { } from Equation (2) to substantially 1 within the frequency range of use. However, such an adjustment is difficult when C is non-linear and dependent on amplitude and changes with time.

If C were to be made known by measurement and so on, time and labor would be needed to take measurement each time the specimen under test is replaced and adjust the control unit.

Figure 4:
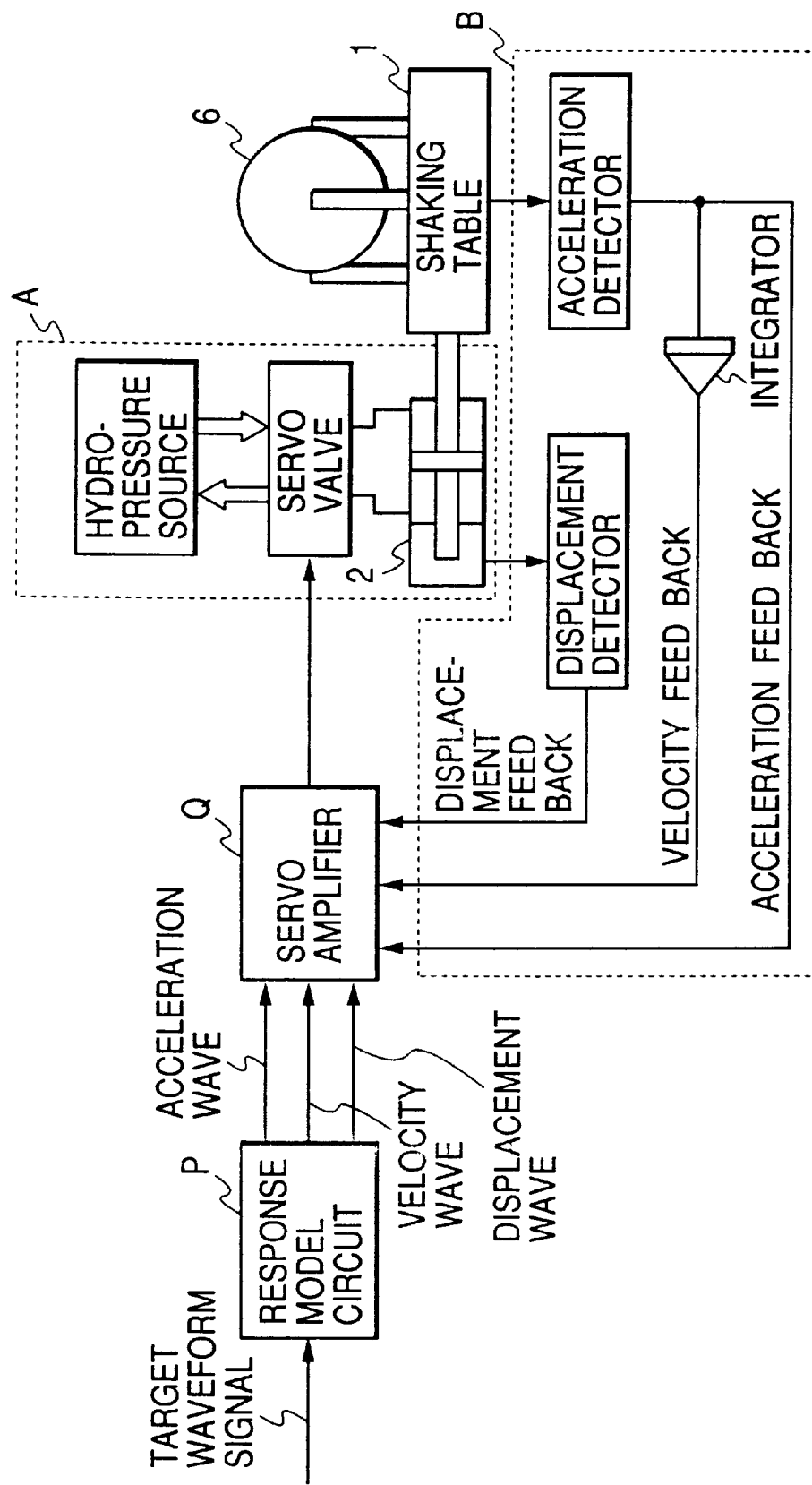
FIG. 4 is an exemplary schematic diagram of a conventional oil-hydraulic actuator.

A description will be given of the blocks A, B, P, Q by taking an oil-hydraulic actuator. FIG. 4 is an exemplary diagram of a shaking table using such an oil-hydraulic actuator. FIG. 4 shows an example of using not only acceleration but also velocity and displacement as a feedback signal. A target acceleration signal in the form of, for example, a voltage signal is inputted to a response model circuit. This circuit is equivalent to P. Three waveforms of velocity and displacement in addition to acceleration may be output from the response model circuit and input to a servo amplifier. On the other hand, at least the actual acceleration of the table, and the velocity and displacement thereof as occasion demands, are detected by respective sensors. The detected signals are also inputted to the servo amplifier. These sensors are equivalent to B. Further, the servo amplifier is equivalent to Q. A driving signal is outputted from these signals and applied to a servo valve. The servo valve controls the flow rate and direction of the pressure oil supplied to the actuator so that the table is driven in a direction in which the deviation of the actual motion of a table from a target becomes smaller. In other words, the servo valve operates in such a way that a deviation signal always becomes 0. The transfer function between the driving signal applied to the servo valve and the force applied to the table is equivalent to A.

Figure 1:
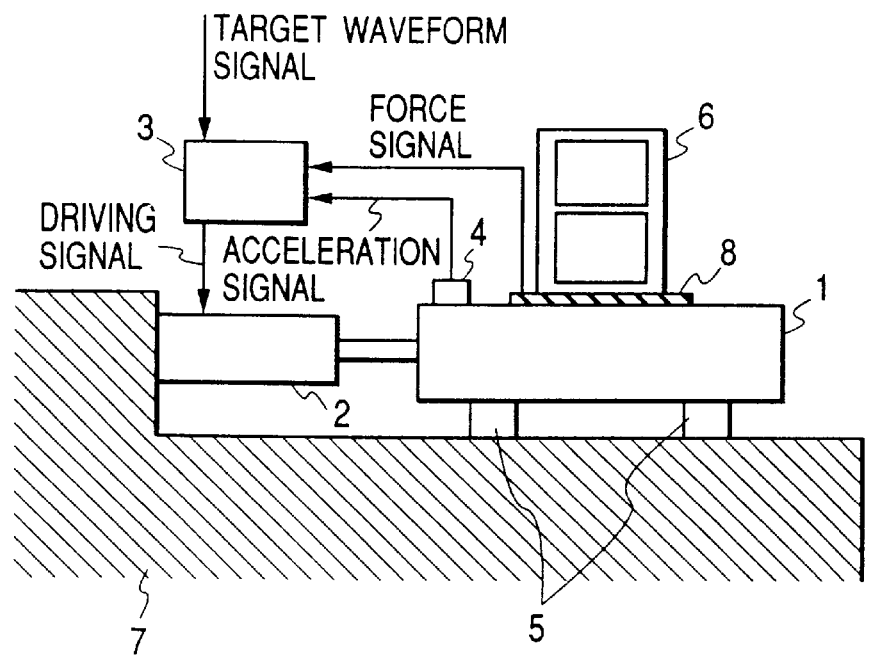
FIG. 1 is an exemplary schematic diagram of an embodiment of the present invention.

A description will subsequently be given of an embodiment of the present invention. FIG. 1 is a block diagram of an embodiment of the present invention. For the shaking table shown in FIG. 2, a measuring means 8 for measuring the force applied to a table 1 from a specimen under test 6 is provided as a second measuring means with respect to a first measuring means for measuring acceleration in order to make the measured value a feedback signal for a actuator control unit 3. With this arrangement, because the force applied by the specimen under test to the table is measured, and a signal for making the actuator generate a force to cancel the force applied by the specimen under test is superposed on the input signal of the actuator, the acceleration can be reproducible with accuracy without being affected by the fluctuation of the dynamic characteristics of the specimen under test and the like.

Figure 5:
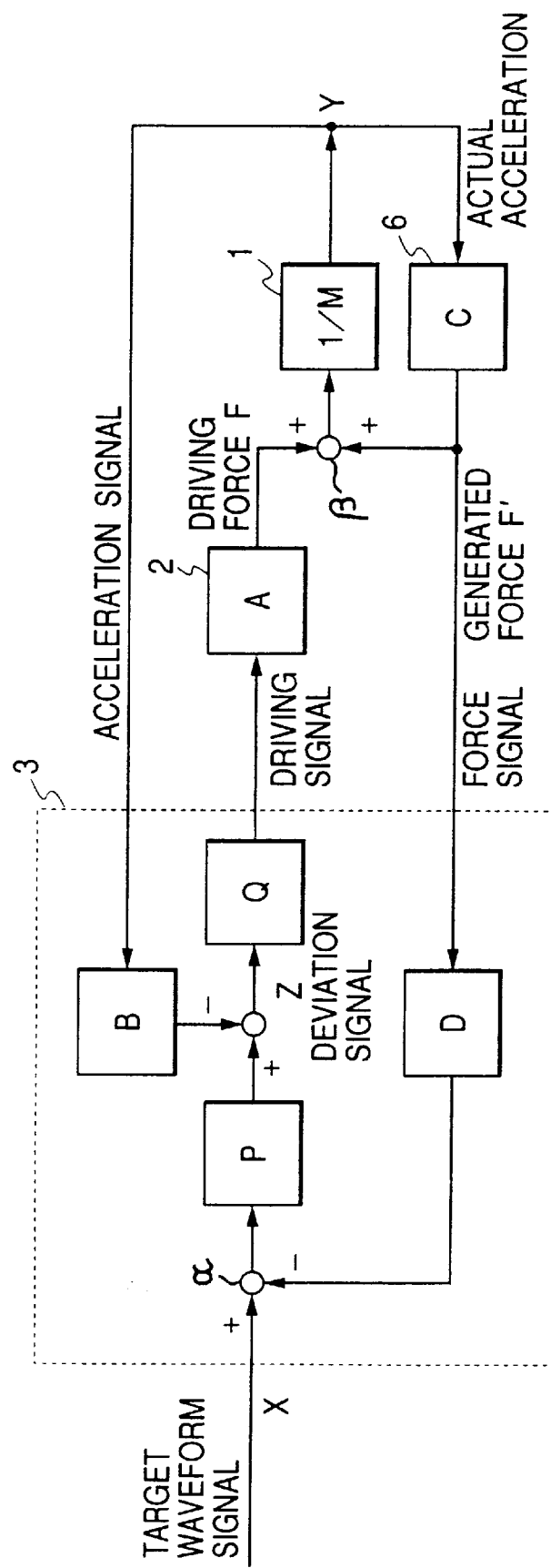
FIG. 5 is a block diagram illustrating a controlling mode embodying the present invention.

FIG. 5 is an exemplary diagram illustrating the control condition of FIG. 1. As shown in FIG. 5 in addition to the block diagram of FIG. 3, the target waveform X is corrected by measuring the load F' applied to the table 1 from the specimen under test 6 to form a feedback signal to the control unit 3 and by subjecting the signal to filter processing represented by a block D.

The transfer function of the target signal X and the attainable acceleration Y of the shaking table in the embodiment of the present invention illustrated in this block diagram is expressed by the following equation:

$$Y=[(1+AQB/M-\{1-AQPD\}C)^{-1}AQP/M]X \quad (3)$$

Hence, a transfer function in the state of a no-load state becomes obtainable without depending on C by setting D as follows:

$$D=(AQP)^{-1} \quad (4)$$

Therefore, highly accurate acceleration reproducibility is available even when C is non-linear and dependent on amplitude and changes with time.

In other words, the desired shaking condition is always obtainable without adjusting the characteristics of the control unit each time a new specimen under test is loaded on the table. If the characteristics of the control unit are adjusted so that the control unit is most suitably operated in the no-load state (the state in which no specimen under test is loaded), the shaking condition in the no-load state is always obtainable, irrespective of the specimen under test.

Also, D needs not strictly satisfy the conditions above but it is only required to have the characteristics within the range of frequencies at which the shaking table is used. In the case of a shaking table for use in the seismic test, for example, the characteristics are within the range of DC–30 Hz. Further, it is only needed to make available acceleration reproducibility practically allowable even though errors exist to some extent.

Figure 6:
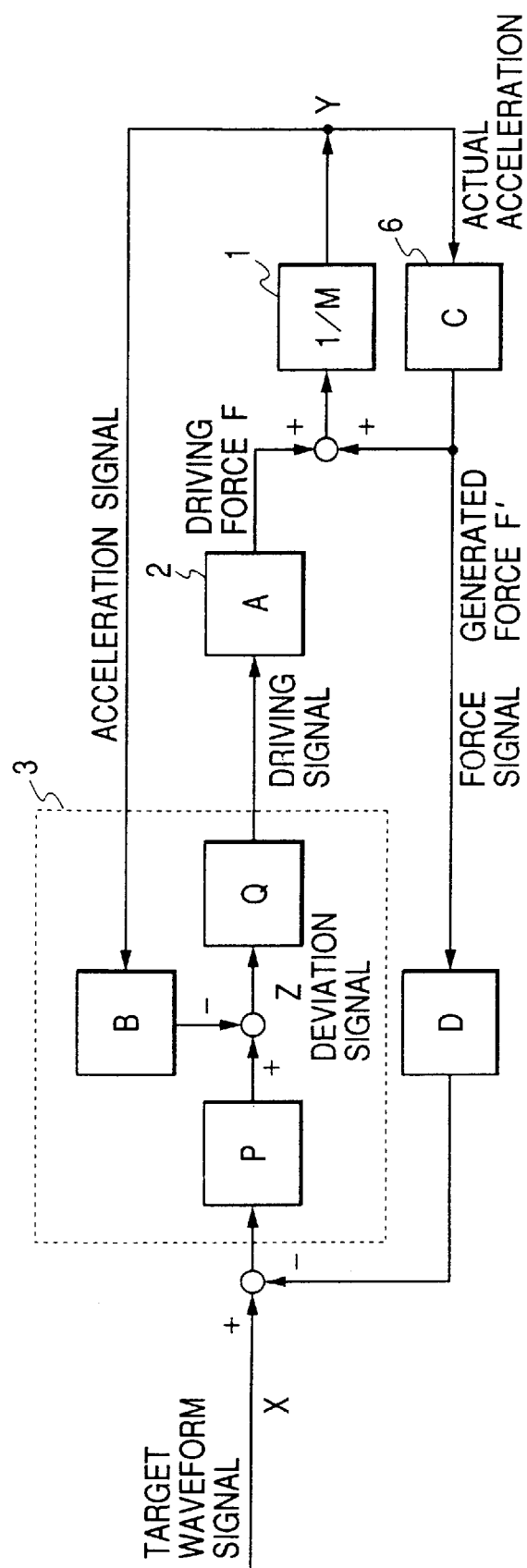
FIG. 6 is a block diagram explanatory of a method of feeding back a force signal embodying the present invention.

The measured value of the force in FIGS. 1 and 5 is directly inputted to the control unit of the shaker as a feedback signal. However, this sort of arrangement is not necessarily required to be made. For example, the force measuring signal subjected to the filter processing is subtracted from the original target waveform signal as shown in FIG. 6 and the result may be inputted to the control unit as a target waveform, whereby the same effect is achievable as in the aforesaid embodiment of the present invention. This process may be performed with an analog circuit or a digital circuit such as a DSP.

Figure 7:
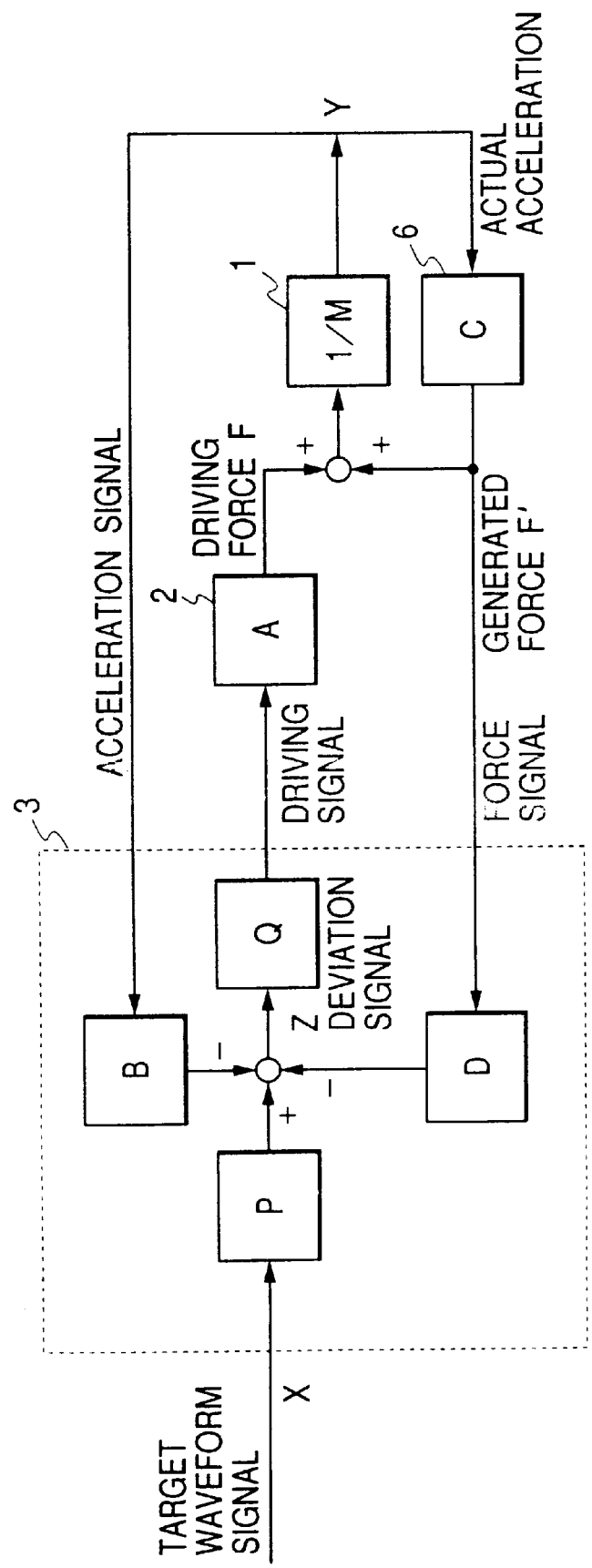
FIG. 7 is a block diagram explanatory of a method of feeding back a force signal embodying the present invention.
Figure 8:
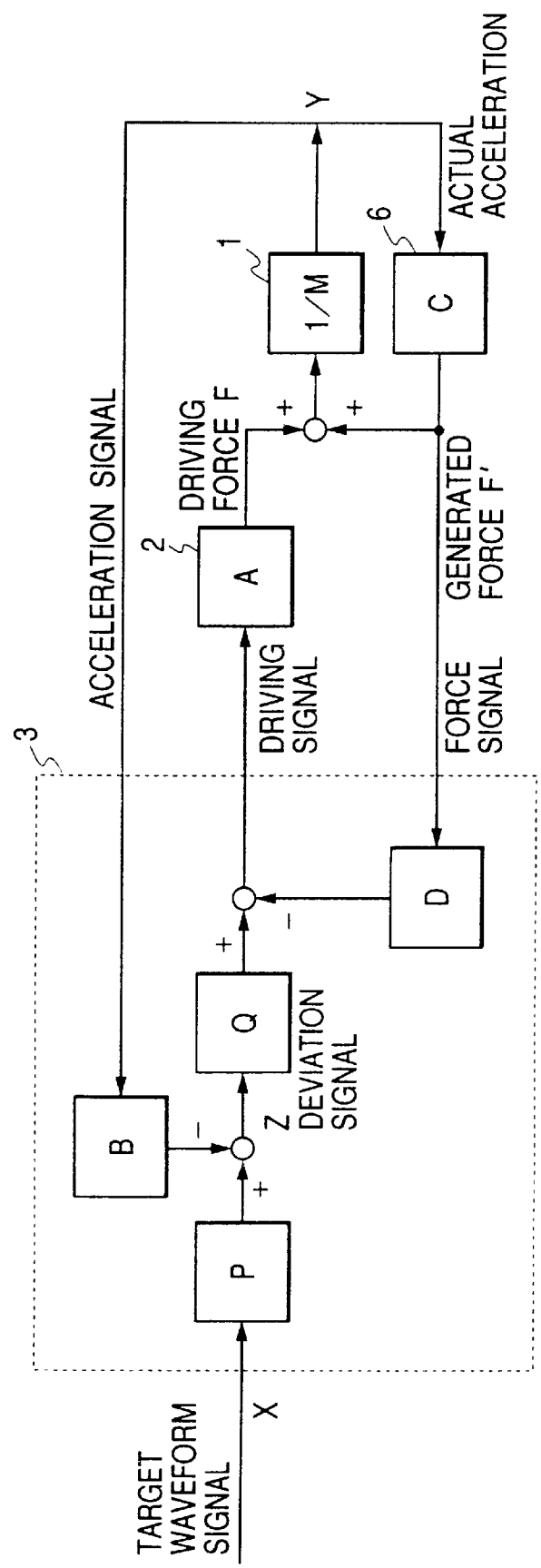
FIG. 8 is a block diagram explanatory of a method of feeding back a load signal embodying the present invention.

Further, the position where the load measuring signal is fed back is not limited to what has been defined in the aforesaid embodiment of the present invention; for example, the signal may be fed back after being subjected to the processing P as shown in FIG. 7. In this case, $$D=(AQ)^{-1} \tag{5}$$

Moreover, the signal may be fed back after being subjected to the processing Q. In this case, $$D=(A)^{-1} \tag{6}$$

In a word, the processing D may be based on the inverse transfer function of the transfer function from the position where the signal is fed back up to the driving force F.

A description will subsequently be given of several force measuring means embodying the present invention.

Figure 9:
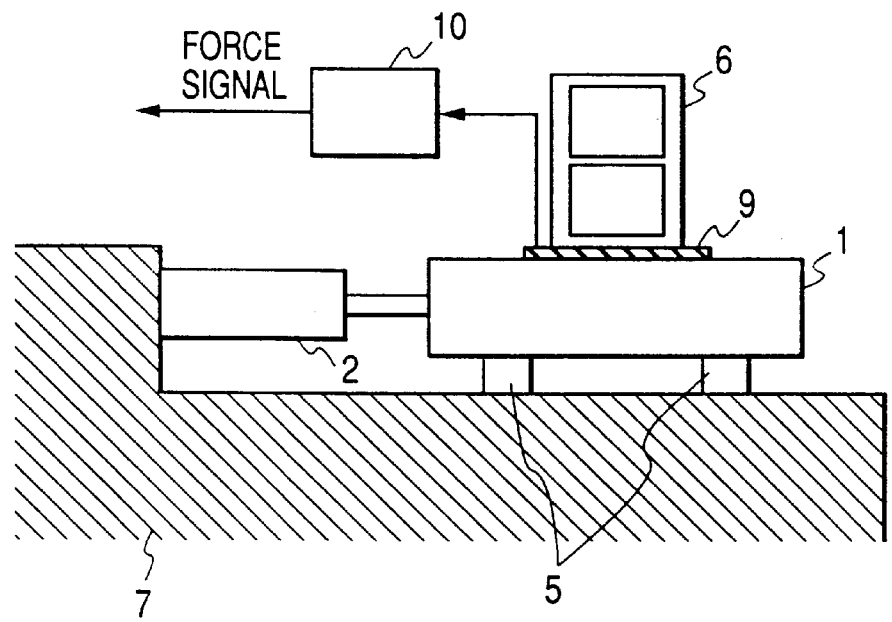
FIG. 9 is an exemplary schematic diagram of a force measuring means embodying the present invention.

In FIG. 9, a load cell 9 is disposed between the specimen under test 6 and the table 1. Because the load applied to the table 1 from the specimen under test 6 is transferred via the load cell 9, it is possible to measure a desired load. The measured signal in the load cell 9 is converted by a converter 10 into a signal usable in the control unit.

Figure 10:
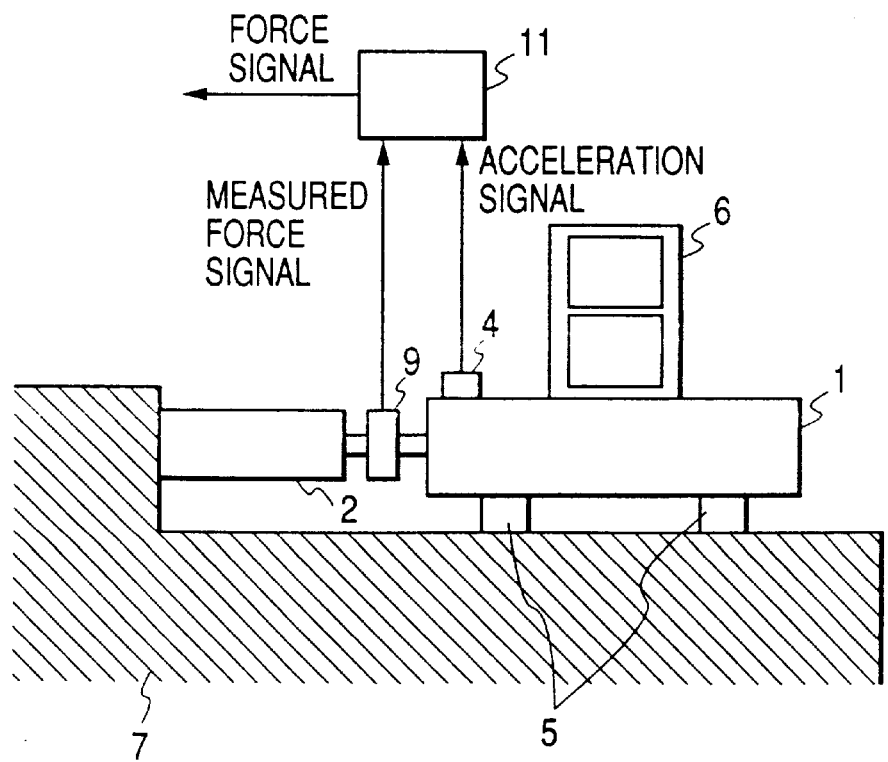
FIG. 10 is an exemplary schematic diagram of another force measuring means embodying the present invention.

FIG. 10 shows another force measuring means embodying the present invention. The force measuring means is provided between the actuator 2 and the table 1. As the resultant of the force applied to the table 1 from the specimen under test 6 and inertia force originating from the mass of the table 1 is measured in the load cell 9, a desired load is made obtainable through the steps of configuring a processor 11 to measure the acceleration of the table 1 in order to calculate the inertia force by multiplying the measured acceleration by the already known mass of the table, and subtracting the inertia force from the measured value in the load cell. In this case, an analog circuit may be used for the processing above or otherwise a digital circuit such as a DSP may be used therefor. Further, the processor 11 converts the processed result into a suitable form and outputs this as a measured signal.

According to this embodiment of the present invention, the specimen under test 6 can be fixed firmly to the table and consequently the strength and the like of the fixing portion less affects the test results; in other words, this arrangement is characterized in that the presence of the load cell hardly affects the results of shaking tests for the specimen under test 6 in comparison with the structure in which the specimen under test 6 is placed on the load cell.

In an embodiment where the oil-hydraulic actuator is used as an actuator, what is obtained by multiplying the differential pressure in the piston portion by the area presented thereto becomes equivalent to the measured force in the load cell 9. Therefore, the measured value of the force is acquired by performing the same processing as described above. In this embodiment, the provision of the load cell 9 is unnecessary with the effect of simplifying the structure.

The force measuring means is not limited to those defined in the above-described embodiments of the present invention but may be any other appropriate one.

Although a description has been given of shaking tables applicable to earthquake resistance tests, the same effect is achievable even when they are applied to other shaking tests. In a case where a shaking test for shaking a specimen under test with a random wave having a desired power spectrum is carried out, a waveform having the power spectrum is prepared beforehand in order to accomplish a desired object by faithfully reproducing the waveform upon the application of the present invention to this case.

In the aforesaid embodiments of the present invention, descriptions have been given of the case where the table shaking direction is horizontal; the structure in which the table is supported with the bearings; and the oil-hydraulic actuator as an actuator by way of example. However, the present invention is not limited to the embodiments thereof as described above. That is, the present invention is applicable to cases where the table is of any other type and where the actuator is any one other than the oil-hydraulic actuator, for example, an electromagnetic shaker with the same effect. In this embodiment, only the transfer function D need be changed because the transfer function A in FIGS. 5–8 is changed to what is fit for such an electromagnetic shaker.

Moreover, the present invention is also applicable to a shaking table having more than one degree of freedom with the same advantageous effect. In short, the present invention may be modified in various manners without departing from the spirit and scope thereof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shaking table, comprising:

a table for loading a specimen under test; means for driving said table, having a characteristic of transfer function from a control signal to a driving force output (A);

acceleration measuring means for measuring acceleration of said table;

a control unit for outputting a control signal to said driving means with receiving an acceleration signal from said measuring means and with receiving a target signal; and means for detecting a force reacted by the specimen under test, and a force signal from said force detecting means is fed back to said control unit;

wherein said control unit pre-processes the target signal (P), pre-processes the acceleration signal from said acceleration measuring means (B), generates a deviation signal (Z) by comparing the pre-processed target signal (X) with the pre-processed acceleration signal, and post-processes the generated deviation signal to output the control signal to said driving means (Q), and wherein said control unit is provided with a filter having an inverse of a transfer function representing a dynamic response of a control system sequentially connected from a feed back point of an output from said force detecting means to an output from said driving means.

2. The shaking table according to claim 1, wherein said force detecting means is a load cell operatively arranged between said table and the specimen under test.

3. The shaking table according to claim 1, wherein said force detecting means is a load cell operatively arranged between said driving means and said table.

4. The shaking table according to claim 3, wherein said acceleration measuring means comprises an acceleration detector, the shaking table further comprising means for subtracting a value resulting from multiplying an acceleration value output from said acceleration detector by a mass of the table from a force detected by said load cell.

5. A shaking table, comprising:

a table for loading a specimen under test;

driving means for driving the table having a transfer function (A) from a control signal to an outputted driving force;

means for measuring acceleration of said table;

a control unit for receiving a target signal and an output from said acceleration measuring means to output a control signal for said driving means, wherein the control unit comprises a pre-process block (P) for the target signal, a pre-process block (B) for the output from said acceleration measuring means, a first comparator for making a deviation signal between an output of said block (P) and an output of said block (B), and a post-process block (Q) for an output of said first comparator to output said control signal for said driving means; and means for detecting a force applied from the specimen under test, wherein the output from said force detecting means is fed back to said control unit, and wherein said control unit is provided with one of:

(i) a filter (D) for an output from said force detecting means having an inverse dynamic characteristics of a system composed by connecting said block (P), said block (Q), and the driving-means transfer function (A) sequentially and a second comparator director before said block (P) to subtract the output of said filter (D) from the target signal, (ii) a filter (D) for an output from said force detecting means having an inverse dynamic characteristics of a system composed by connecting said block (Q), and the driving-means transfer function (A) sequentially and a second comparator directly before said block (Q) to subtract the output of the filter (D) from said first comparator, and (iii) a filter (D) for an output from said force detecting means having an inverse dynamic characteristics of the driving means transfer function (A) and a second comparator directly after said block (Q) to subtract the output of the filter (D) from the output of said block (Q).

6. The taking table according to claim 5, wherein said force detecting means is a load cell operatively arranged between said table and the specimen under test.

7. The shaking table according to claim 5, wherein said force detecting means is a load cell operatively arranged between said driving means and said table.

8. The taking table according to claim 7, wherein said acceleration measuring means comprises an acceleration detector, the shaking table further comprising means for subtracting a value resulting from multiplying an acceleration value output from said acceleration detector by a mass of the table from a force detected by said load cell.

9. A method of controlling a shaking table having a table for loading a specimen under test, driving means for driving the table, means for measuring motion of the table, and a control unit for feeding back a signal outputted by the motion measuring means and comparing the feedback signal with a target acceleration signal to obtain deviation for controlling the driving means, comprising:

measuring a force applied to the table from the specimen under test, filtering the measured force signal with a filter, and subtracting the filtered force signal from a target acceleration signal to obtain a result for controlling the driving means.

10. A method of controlling a shaking table according to claim 9, wherein the driving means has a transfer function (A) from a control signal to an outputted driving force and the control unit has a pre-process block (P) for the target acceleration signal, a pre-process block (B) for the output from the acceleration measuring means, a first comparator for making a deviation signal between an output of the block (P) and an output of the block (B), and a post-process block (Q) for an output of the comparator to output a control signal and the filter has an inverse dynamic characteristic of a control system composed by connecting the block (P), the block (Q), and the driving means transfer function (A) sequentially.

* * * * *